United States Patent
Kartisek

[11] Patent Number: 6,090,466
[45] Date of Patent: Jul. 18, 2000

[54] GARDENING AID

[76] Inventor: William G. Kartisek, 5037 Tipperary, Christiansted, Virgin Islands (U.S.) 00820-4585

[21] Appl. No.: 09/274,344

[22] Filed: Mar. 23, 1999

[51] Int. Cl.[7] .................................................... B65F 1/14
[52] U.S. Cl. ......................... 428/102; 428/131; 428/136; 383/4; 294/1.1
[58] Field of Search ................................. 428/102, 131, 428/136; 383/4; 294/1.1; 56/329

[56] References Cited

U.S. PATENT DOCUMENTS

| | | | |
|---|---|---|---|
| D. 301,536 | 6/1989 | Spear | D8/1 |
| D. 380,127 | 6/1997 | Feigh et al. | D8/1 |
| 4,058,956 | 11/1977 | Skonieczny | 56/1 |
| 4,539,800 | 9/1985 | Furmaga | 56/329 |
| 4,703,615 | 11/1987 | Andrews | 56/329 |
| 5,324,581 | 6/1994 | Valencic | 428/284 |

FOREIGN PATENT DOCUMENTS

| | | |
|---|---|---|
| 4107233 | 9/1992 | Germany . |
| 705090 | 10/1954 | United Kingdom . |
| 1381679 | 1/1975 | United Kingdom . |

*Primary Examiner*—Alexander Thomas
*Attorney, Agent, or Firm*—Richard C. Litman

[57] ABSTRACT

A gardening aid in the form of a nylon pruning cloth which has a split down its center and terminates at a central circular section. A pouch is sewn on one side of the cloth to collect pruned clippings. The pruning cloth fits around the base of a shrub or tree and catches the clippings as they fall. When the pruned specimen is completely trimmed, any of the clippings which have not fallen from the specimen onto the pruning cloth may be swept thereupon and towed away for easy and clean removal from a particular work site.

8 Claims, 2 Drawing Sheets

GARDENING AID

BACKGROUND OF THE INVENTION

1. Field of the Invention

The present invention relates generally to aids for trimming shrubs. More specifically, the invention is a nylon cloth for removing debris cut from and found around shrubs, trees, etc.

2. Description of Related Art

Removable ground covers or shrub clipping catchers of various sorts have been devised as a way of providing a clean finish to a trimmed bush or tree. However, the problem with most conventional ground covers is it becomes quite difficult for a single user to handle or maneuver the covers or catchers after they have been filled with debris. This type of limitation is prominent in most of the related conventional catchers. For example, U.S. Design Pat. No. 301,536 issued to Spear illustrates a circular ground cover design having a recessed ridge or rim for catching clippings from a bush or tree. There is no teaching or suggestion for storing the clippings in a compartment within the cover or catcher for subsequent tow-away or disposal as in the instant invention.

U.S. Design Pat. No. 380,127 issued to Feigh et al. similarly illustrates a shrub clipping catcher having an octagonal shape. The edges are raised and double as a catcher and respective carrier. The catcher portion is formed by all eight sides with four opposing sides having through holes to accommodate a hand for carrying. This particular design requires a user to bend in order to grip and pull the device. This particular feature has the potential of causing lower back injuries to a user. The ground cover or catcher of the instant invention avoids this potential difficulty as described herein.

U.S. Pat. No. 4,539,800 issued to Furmaga discloses a shrub rug which is composed of a mat secured by string to a part circle, metal frame. The frame collapses to form a pouch for carrying accumulated debris for disposal. The catcher according to the instant invention is simple and easy to use and does not require any sort of frame structure.

U.S. Pat. No. 4,703,615 issued to Andrews discloses a multi-purpose trim and yard receptacle having a basin like structure with a flat rigid base. The structure has an outer wall with multiple handles disposed at the periphery. A central portion of the device has a wedge shaped recess for abutting or receiving the trunk of a tree in tiered fashion. This device is completely different to that of the instant invention as further described herein.

U.S. Pat. No. 5,324,581 issued to Valencic discloses a heavy duty fabric supported by two poles. The cloth is laid in the area of a work-site for use and the poles are inserted in respective slots, and joined together to create a carrying pouch. Depending on the relative distance of a particular work site including a waste removal location, the idea of transporting poles along with the accumulated debris on the cloth during use can be quite frustrating, burdensome and subsequently physically demanding. The garden aid according to the instant invention alleviate these particular problems for a user as described herein.

Foreign Patents issued to Slater (London 705,090) and Schneider (DE 41 07233) respectively disclose structural elements such as aluminum plates and protective sleeves or screens which are generally relevant to the instant invention. Similarly, the British Patent 1,381,679 by Williams discloses a plant protection and moisture retention disc having holes and slots, but there is no teaching or suggestion for removing debris or clippings as described herein by the instant invention.

The garden aid according to the instant invention is different from the prior and related art in that it provides a removable ground cover or pruning cloth for catching and storing debris for easy removal without the need for rigid supports. In this regard, none of the above inventions and patents, taken either singly or in combination, is seen to describe the instant invention as claimed.

SUMMARY OF THE INVENTION

The gardening aid according to the instant invention is a nylon pruning cloth which has a split down its center and terminates at a centrally disposed circular section. A pouch is sewn on one side of the cloth to collect the pruned clippings. The pruning cloth fits around the base of a shrub or tree and catches the clippings as they fall. When the pruned specimen is completely trimmed, any of the clippings which have not fallen from the specimen onto the pruning cloth may be swept thereupon for easy and clean removal from a particular work site.

Accordingly, it is a principal object of the invention to provide a gardening aid or pruning cloth for removing clippings from a bush, tree, etc. which is lightweight and simple to use.

It is another object of the invention to provide a pruning cloth which has a design for reducing lower back injuries.

It is a further object of the invention to provide a pruning cloth which is easily deployed and reduces clean-up time.

Still another object of the invention is to provide a pruning cloth which retains clippings or debris without disturbing underlying gardening beds.

Further still, it is an object of the invention to provide a pruning cloth which is quickly cleaned and easily stored.

It is an object of the invention to provide improved elements and arrangements thereof in the gardening aid for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a gardening aid in the form of a pruning cloth for catching clippings from shrubs, trees, etc. A preferred embodiment of the present invention is depicted in FIGS. 1 and 2 and is generally referenced by numeral 3.

Figure 1:
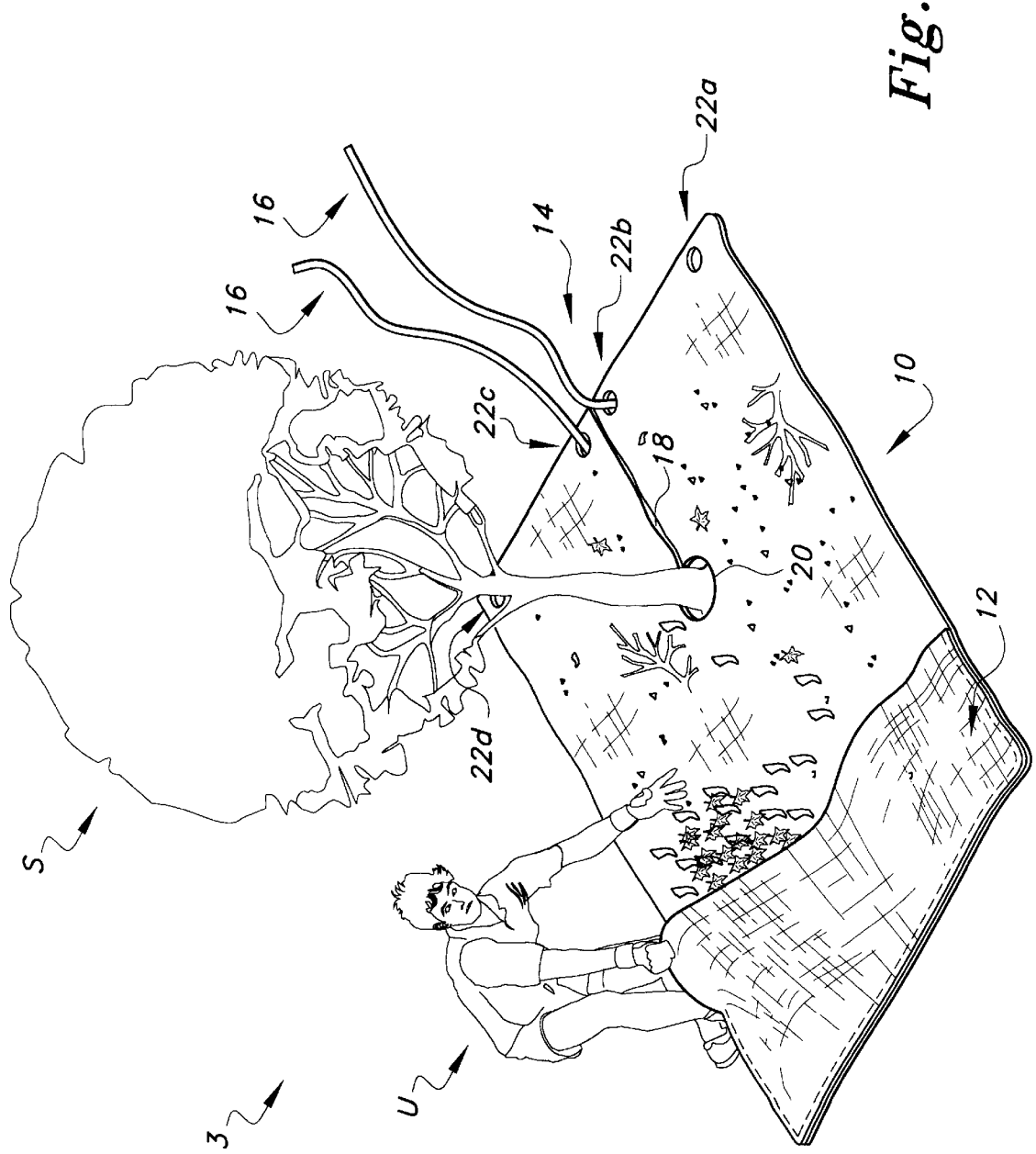
FIG. 1 is an environmental view of the gardening aid according to the present invention.
Figure 2:
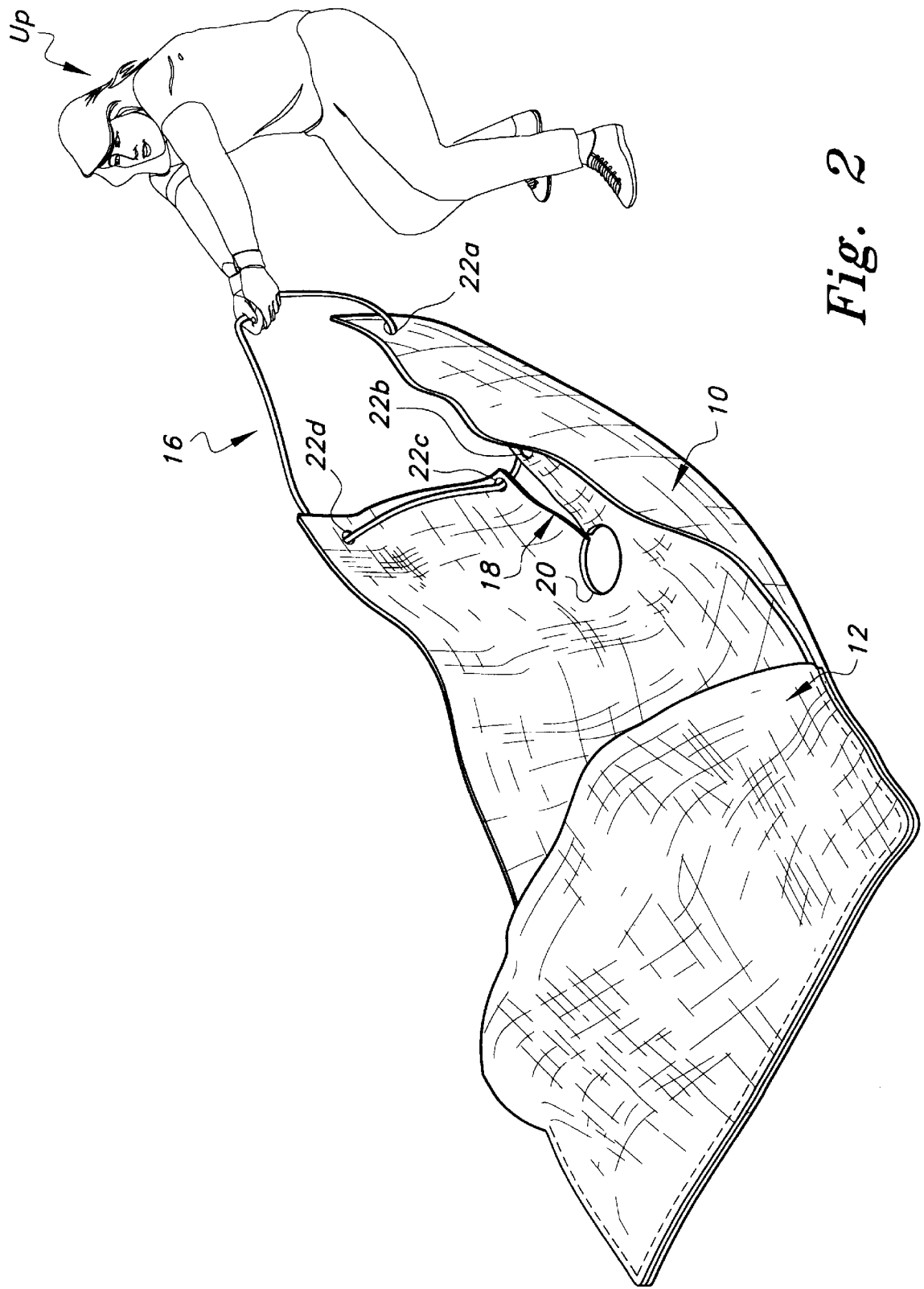
FIG. 2 is a perspective view of the gardening aid according to the invention, illustrating carrying and towing features of the invention.

As best seen in FIG. 1, the pruning cloth 3 for catching clippings from a pruning specimen S (i.e. bushes, trees, shrubs or hedges) comprises a planar cloth material 10, a pouch 12 and a connecting means 14 for attaching a pulling means 16 to the material 10. Also, a central slit 18 is formed within the material 10 starting at an end of the cloth 3 and terminating at the center of the cloth 3 via a centrally disposed circular hole 20. On this same end, the cloth 3 further comprises four circular rings (22a, 22b, 22c, and 22d) which are symmetrically disposed within the cloth 3 near the edge, defined by the starting point of the slit 18 as shown in FIG. 1. While the pruning cloth 3 diagrammatically illustrated in FIG. 1 is substantially rectangular as an exemplary embodiment of the-present invention, the design of the cloth 3 can be of various different shapes depending on the intended use of the cloth by the skilled artisan. In some applications the garden landscape may be easily accessible depending on the unique design and spatial properties of the work site. The slit 18 is preferably formed on a short end of the cloth 3 to take advantage of the length along the longer sides of the rectangular exemplary embodiment for ease of access to a specimen S. This same technique can be similarly used for pruning cloths of other geometrical shapes as well. While no specific dimensions have been indicated for the size of the garden aid according to the invention, it would be obvious to one of ordinary skill in the art to size the pruning cloth 3 according to the particular need of a user or as a matter of personal preference.

The pouch or pocket 12 is stitched or sewn to ensure a holding capacity sufficient for the debris or clippings from the pruned specimen S without the fear of failure by a user U. After stuffing the pouch 12 with debris, the pruning cloth 3 can be easily carried or towed away for proper disposal of the debris by young and old gardeners alike. The pouch 12 can also be made to hold special gardening tools and items such as trowels, shears, seeds, gloves, etc. as optional features (not shown). The rings or holes 22a, 22b, 22c and 22d serve as a connecting means for attaching a rope 16 or other pulling means thereto for pulling the cloth 3 within the area of a work-site or for removing or disposing debris or clippings from the work-site. Other attachments such as a riding mower can be used as a pulling means (not shown) in the event a user is not capable of towing the pruning cloth away. If exercise is of key interest to a user U, FIG. 2 shows an illustration of a physically fit user $U^P$ pulling the pruning cloth 3 utilizing arm back and leg muscle groups. To reduce the risk of back injury the user can carry the cloth 3 by double gripping the rope 16 with both hands having the rope 16 resting and being pulled over a left or right shoulder depending upon a user's U dominant hand. In addition, special attachments for a riding mower can be made by attaching chain-linked hooks or similar attachments to the rings or holes 22a, 22b, 22c and 22d.

The aforementioned rings are preferably stain-less steel rings, but can be gold plated, anodized aluminum and/or a titanium alloy. The material of the pruning cloth 3 according to the invention is preferably nylon which has the unique qualities of being durable and water resistant. Another advantage of the material properties of the instant invention is that the pruning cloth 3 is easily cleaned by rinsing, and quickly dried by convection thereby reducing the effects associated with mildew during storage.

It is to be understood that the present invention is not limited to the embodiments described above, but encompasses any and all embodiments within the scope of the following claims.

I claim:

1. A gardening aid for removing clippings from trees, shrubs and bushes or hedges comprising:
    a planar cloth material, a pouch and a connecting means for attaching a pulling means to said material;
    the material further comprises a central slit starting at an end and terminating at the center of the cloth defined by a centrally disposed circular hole.

2. The gardening aid according to claim 1, further comprising four circular rings disposed within the cloth symmetrically disposed along the end comprising the starting point of the slit.

3. The gardening aid according to claim 2, wherein the connecting means is defined by each of said rings.

4. The gardening aid according to claim 3, wherein said rings are made of a metallic material.

5. The gardening aid according to claim 1, where in the connecting means is the cloth material.

6. The gardening aid according to claim 5, wherein said material is nylon.

7. The gardening aid according to claim 1, wherein said pulling means is a rope.

8. The gardening aid according to claim 1, wherein said pouch is a stitched pouch.

* * * * *